United States Patent [19]

Lunden

[11] Patent Number: 5,573,613
[45] Date of Patent: Nov. 12, 1996

[54] INDUCTION THERMOMETRY

[76] Inventor: C. David Lunden, 37131-8th Ave. S., Federal Way, Wash. 98003

[21] Appl. No.: 367,969

[22] Filed: Jan. 3, 1995

[51] Int. Cl.⁶ .................................................. B32B 31/00
[52] U.S. Cl. ..................... 156/64; 156/272.4; 156/274.2; 156/359; 219/633; 219/662; 219/667
[58] Field of Search ................................... 156/64, 272.2, 156/272.4, 359, 274.2; 219/633, 634, 662, 667; 324/340; 364/557

[56] References Cited

U.S. PATENT DOCUMENTS

| | | |
|---|---|---|
| 2,241,312 | 5/1941 | Luty . |
| 2,273,423 | 2/1942 | Somes . |
| 2,372,929 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,720,576 | 10/1955 | Lackner ................................... 219/669 |
| 2,739,829 | 3/1956 | Pedlow et al. . |
| 2,761,941 | 9/1956 | Ardichvili . |
| 2,898,435 | 8/1959 | Crafts . |
| 3,061,503 | 10/1962 | Gould et al. . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,427,421 | 2/1969 | Matheson et al. . |
| 3,431,379 | 4/1969 | Yrene . |
| 3,435,172 | 3/1969 | Emerson ............................. 219/667 X |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt et al. . |
| 4,180,717 | 12/1979 | Lenk et al. . |
| 4,288,271 | 9/1981 | Campbell, Jr. et al. ................ 156/359 |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |

(List continued on next page.)

FOREIGN PATENT DOCUMENTS

| | | |
|---|---|---|
| 0461979B1 | 4/1994 | European Pat. Off. . |
| 54-25542 | 2/1979 | Japan . |

OTHER PUBLICATIONS

J. Giachino, Welding Skills and Practices, Am. Tech. Soc., Chicago, IL (1960,1965,1967,1971,1976) 393–401.

Primary Examiner—David A. Simmons
Assistant Examiner—Paul M. Rivard
Attorney, Agent, or Firm—John C. Hammar

[57] ABSTRACT

A method and apparatus for sensing the temperature of a susceptor in a bond line in an inductive welding process utilizing a conductive susceptor at the interface between the two plastic parts, and a magnetic coil that generates an alternating magnetic field and projects the field through the parts and around the susceptor. As the susceptor gets hot, its electrical resistance changes as a function of the thermal coefficient of resistance of the susceptor material, and that change of resistance is reflected back as a change in the drive coil impedance. An electrical circuit senses the varying resistance and that change in resistance is translated into a change of temperature on a temperature display, and may be used to adjust the power to the work coil or the speed of travel of the work coil along the bond line. The circuit includes a high power bridge with a sensitive null arm to sense changes in the susceptor impedance due to temperature changes.

16 Claims, 4 Drawing Sheets

U.S. PATENT DOCUMENTS

| | | |
|---|---|---|
| 4,416,713 | 11/1983 | Brooks . |
| 4,421,588 | 12/1983 | Davies . |
| 4,445,951 | 5/1984 | Lind et al. . |
| 4,489,123 | 12/1984 | Schijve et al. . |
| 4,521,659 | 6/1985 | Buckley et al. . |
| 4,642,155 | 2/1987 | Ramsey ................................. 156/359 |
| 4,653,396 | 3/1987 | Wennerberg . |
| 4,671,470 | 6/1987 | Jonas . |
| 4,673,450 | 6/1987 | Burke . |
| 4,684,789 | 8/1987 | Eggleston ........................ 156/274.2 X |
| 4,749,833 | 6/1988 | Novorsky et al. .................. 219/634 X |
| 4,768,433 | 9/1988 | Boissevain . |
| 4,791,260 | 12/1988 | Waldman . |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,943,706 | 7/1990 | Lyall et al. ....................... 156/274.2 X |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,340,428 | 8/1994 | Kodokian ............................ 156/272.2 |

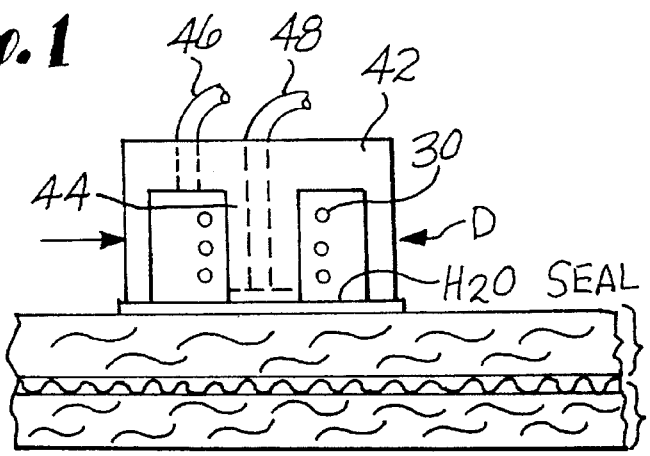
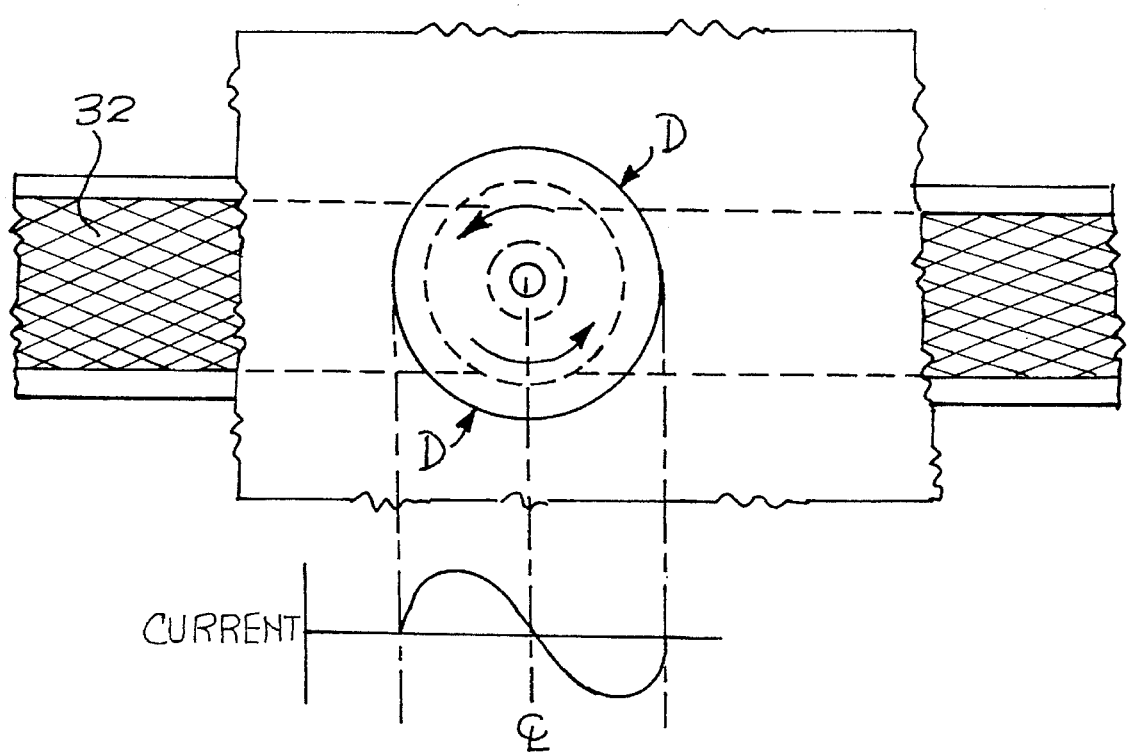

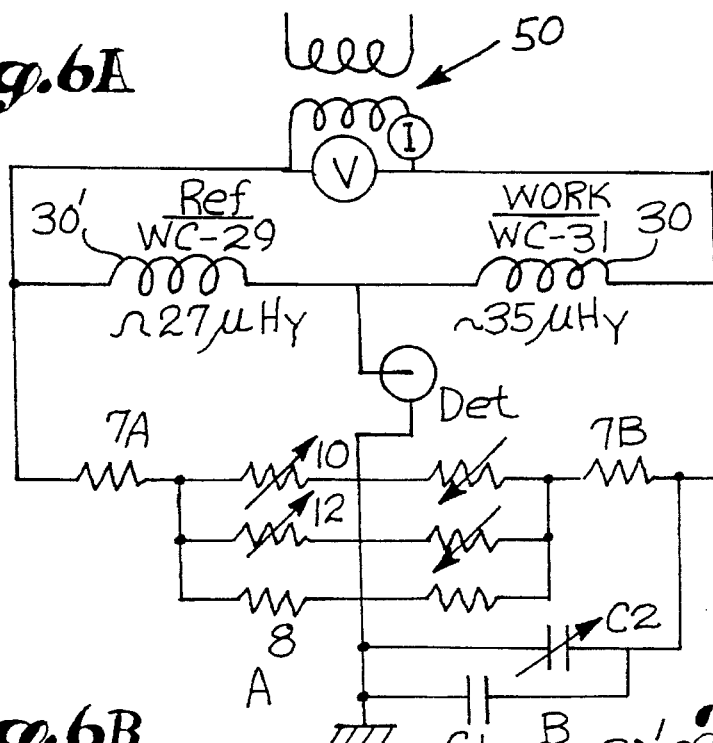
*Fig.* 6A
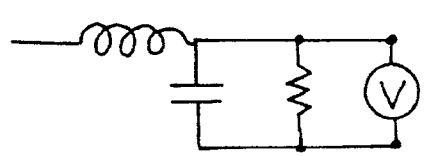
*Fig.* 6B
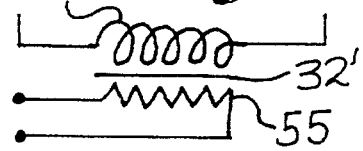
*Fig.* 6C
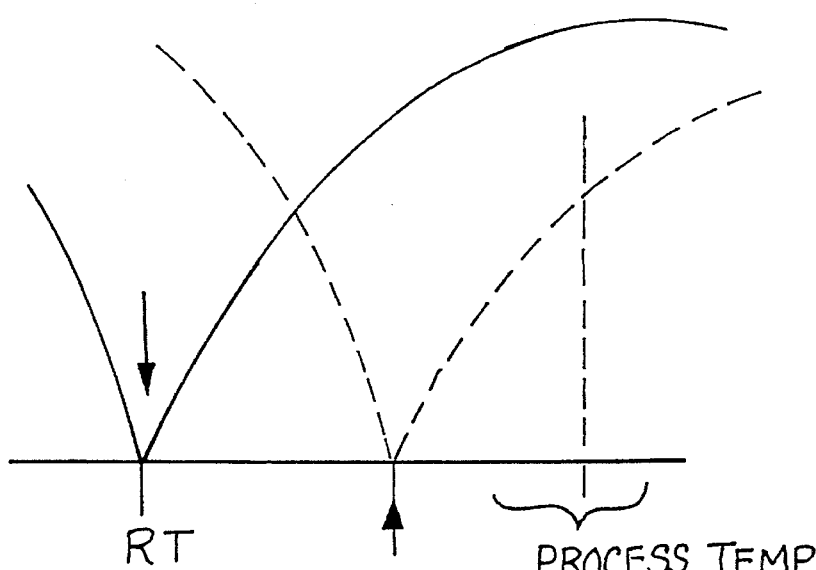
*Fig.* 7

INDUCTION THERMOMETRY

This invention pertains to non-contact measurement of the temperature of temperature-sensitive metals by sensing impedance changes in a primary induction circuit, and more particularly to a method of remotely sensing the temperature in an embedded bond line between two thermoplastic parts being welded together by fusion bonding and controlling the welding process using the temperature data.

BACKGROUND OF THE INVENTION

Fusion bonding, or "welding" of thermoplastic composite material, such as polyimide impregnated graphite, is an emerging technology of great promise in the aerospace field for reducing the cost of fastening parts, such as wing spars, ribs and wing skins, together to make large assemblies, such as a wing box. A large percentage of the cost of the final product that is fastened together by conventional fasteners such as rivers, lock bolts, etc., is in the laborious process of drilling holes, installing fasteners and securing the fastener, usually one at a time.

An apparatus and method for performing welding of thermoplastic composite material is described in U.S. patent application No. 08/352,991 filed on Dec. 9, 1994, by John Mittleider and entitled "Thermoplastic Welding", the disclosure of which is incorporated herein by reference. The method described in the Mittleider application uses a conductive foraminous susceptor at the interface between two parts to be welded together. Eddy currents in the susceptor, induced by an alternating magnetic field generated by an induction coil, heat the susceptor by resistive heating and raise the temperature of the thermoplastic in the faying surfaces of the two parts in contact with the susceptor to the thermoplastic melt point. Pressure is applied to squeeze the two parts together, pressing the melted thermoplastic through and around the interstices of the susceptor and promoting molecular diffusion of the faying surfaces to form a bond region that is continuous and uniform from one part to the other with no discernible junction between the two parts, other than the embedded susceptor.

The DuPont Avamid KIII-B polyimide resin used in the parts described in the aforesaid Mittleider application melts in a range of $T_m=620°\pm20°$ F. The temperature of the melt pool in the interface between the two parts is a sensitive parameter affecting the quality of the bond. Temperatures above the optimal range can cause porosity in the bond region which could weaken the weld, and could also cause delamination and/or sagging of the adjacent structures because of excessive heating of the thermoplastic structure outside of the bond region. Temperatures below the optimal range can prevent the formation of a well "healed" fusion bond. The melt pool in the interface is hidden under the overlying graphite reinforced plastic, ruling out use of infrared radiation sensors.

It is possible to embed thermocouples within material or in an interface between two parts and obtain accurate temperature signals. However, the thermocouples are useful only for sensing the temperature at their position and they cannot be moved to obtain a continuous readout at the point of interest, for example, at the melt pool in a thermoplastic weld joint. The information obtained from use of thermocouples in a temperature feed-back system is thus intermittent and the conditions between thermocouples must be extrapolated from the data obtained from the upstream thermocouples. In a continuous process control system, intermittent data is be less desirable than continuous data.

Thus, the art would be greatly advanced by a continuous remote temperature sensor for thermoplastic welding and other remote temperature sensing applications which can accurately indicate the temperature within a body of material that is not suitable for the application of other conventional temperature sensors.

SUMMARY OF THE INVENTION

Accordingly, it is an object of this invention to provide an improved method and apparatus for remotely sensing the temperature of the region in the interface between two plastic parts. Another object of this invention is to provide an improved circuit for continuously sensing the temperature at a region of interest that is buried under the surface of an opaque material. Yet another object of this invention is to provide an improved process for heating and simultaneous temperature feed-back in an embedded location. A further object of this invention is to provide an improved temperature sensor using the heater itself as a sensor. A yet further object of this invention is to provide an improved process of continuously monitoring the temperature of a melt pool in the bond line of a thermoplastic weld to attain greater control precision than previously possible in a continuous process. A still further object of this invention is to provide a method and apparatus for utilizing a conductive susceptor both to heat the bond line between two plastic parts and to measure the temperature of the bond line. Another object of this invention is to provide an improved control system for adjusting the speed of travel or the power to the work coil in an induction welding apparatus to continuously and automatically maintain the temperature in the bond line at a preselected process temperature.

These and other objects of the invention are attained in a method and apparatus utilizing a conductive susceptor at the interface between the two plastic parts, and a magnetic coil that generates an alternating magnetic field and projects the field through the parts and around the susceptor. As the susceptor gets hot, its electrical resistance changes as a function of the thermal coefficient of resistance of the susceptor material, and that change of resistance is reflected back as a change in the drive coil impedance. An electrical circuit senses the varying resistance and that change in resistance is translated into a change of temperature on a temperature display, and may be used to adjust the power to the work coil or the speed of travel of the work coil along the bond line. The circuit includes a high power bridge with a sensitive null arm to sense changes in the susceptor impedance due to temperature changes.

DESCRIPTION OF THE DRAWINGS

The invention and its many attendant objects and advantages will become better understood upon reading the following description of the preferred embodiment in conjunction with the following drawings, wherein:

FIG. 1 is a schematic elevation of an induction coil positioned over two plastic parts to be welded together by inducing eddy currents in a susceptor positioned between the parts, and showing power leads to the coil by which a circuit is connected for sensing the temperature of the susceptor;

FIG. 2 is a schematic plan view of the plastic parts being welded, showing the pattern of eddy currents induced in the susceptor by the magnetic field generated by the coil;

FIG. 6A is a schematic circuit diagram of a a power bridge similar to the circuit in FIG. 5A, also including trimming elements;

FIG. 6B is a fragmentary electrical schematic of a low bandpass filter to reject harmonics from the voltmeter which senses the bridge null;

FIG. 6C is a fragmentary electrical schematic showing a temperature controlled heater for the reference susceptor in FIG. 6A;

FIG. 7 is a graph of voltage change ($\Delta V$) across the bridge in FIGS. 5 and 6 as a function of temperature.

DESCRIPTION OF THE PREFERRED EMBODIMENT

Figure 3:
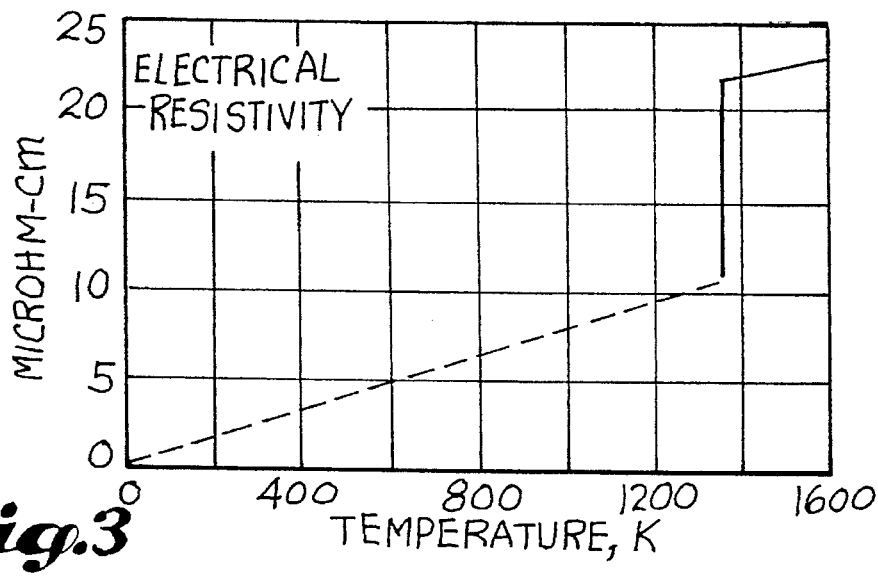
FIG. 3 is a graph showing the electrical resistivity of copper used in the susceptor shown in FIGS. 1 and 2.
Figure 4:
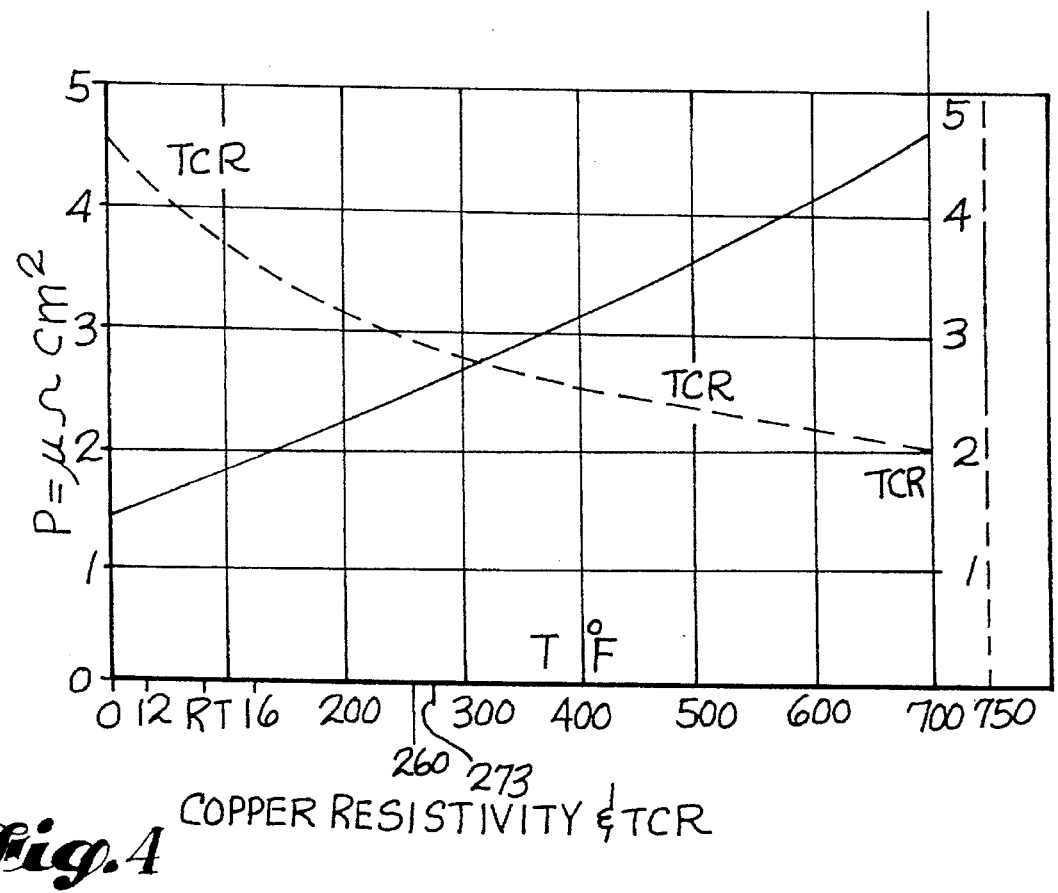
FIG. 4 is a graph showing the temperature relationship of copper resistivity and the temperature coefficient of resistance of copper.

Turning now to the drawings, wherein like reference characters refer to identical or corresponding parts, and more particularly to FIG. 1 thereof, a coil 30 is shown schematically, aligned vertically over a foraminous susceptor 32 positioned in the interface between two plastic parts 34 and 36 for performing a welding process for fusion bonding the two plastic parts together along their interface. The coil generates an alternating magnetic field that propagates through the top part 34 and around the susceptor 32, inducing eddy currents in the susceptor that generate heat by dielectric heating. The plastic in the faying surfaces of the two parts 34 and 36 melts and flows together under the influence of a squeezing force exerted on the parts as represented by the arrows 38 and 40. An apparatus and control system for operating the apparatus is disclosed in the aforementioned patent application of John Mittleider entitled "Thermoplastic Welding" wherein this invention is mentioned as one scheme for bond line temperature monitoring.

The susceptor 32 is a copper ribbon having a foraminous center section and two solid edge sections to concentrate the heating in the center and minimize edge overheating. The susceptor is laid in bond line to "attract" magnetic currents for selective heating; it has a conductivity 10–100 times higher than graphite reinforced thermoplastic composite material of which the parts are made. It is necessary to have an open or mesh pattern in the susceptor to allow the adhesive to migrate through the interstices of the susceptor and bond the composite elements of the assembly. The necessary open or mesh pattern can be used to advantage to achieve conductivity anisotropy in the susceptor to control eddy current flow patterns. Anisotropy, achieved by a woven or etched diamond grid pattern in which the dimension of one axis of the diamond is longer than the other axis of the pattern, makes conductivity depends on direction. The pattern of the foraminous center section, made by etching or by a series of longitudinally offset slits and expanding the slit section laterally, is designed to tailor the conductivity of the susceptor to produce heating where it is needed. A suitable susceptor is disclosed in two patent documents, both of which disclosures are incorporated herein by reference: a U.S. patent application filed by Hansen and Lunden and entitled "Tailored Susceptors for Induction Thermoplastic Welding", and a U.S. patent application entitled "Selvaged Susceptor for Thermoplastic Welding by Induction Heating" filed on Nov. 30, 1994 by Karl Hansen and Edward Weisberg.

The coil 30 is contained in a cylindrical ferrite housing 42 having a ferrite core 44 and cooling water lines 46 and 48, as more fully disclosed in U.S. Pat. No. 5,313,037, and in the aforementioned Mittleider application, the disclosures of which are incorporated herein by reference.

For optimal bond quality, the temperature of the susceptor 32 must be maintained within a fairly narrow range of about 50° F around the melt temperature of the polyimide thermoplastic material, that is, 620°±25° F. A technique for measuring the temperature of the susceptor while simultaneously heating it to the desired temperature utilized the temperature coefficient of resistance of the metal from which the susceptor is made, copper in this case. The resistivity of most metals increases with temperature, defined by the temperature coefficient of resistance, which can be defined as the slope of the curve of resistivity plotted against temperature. For example, when a tungsten-filament light bulb is turned on, there is a sudden inrush of current while the tungsten is cool, followed by a tapering of the current when the tungsten reaches operating temperature. Another example is the technology of temperature measurement with world class precision based on the platinum resistance thermometer, utilizing the temperature coefficient of resistance of platinum. Platinum is used in precision thermometry because noble metals are relatively immune to long term aging and humidity effects. In this invention, the temperature coefficient of resistance of the copper susceptor is utilized to build a temperature sensor.

The TCR of copper, shown in the table of FIG. 2, is actually higher than that of platinum. For most metals, $TCR = 1/R)dR/dT \approx 2 - 8 \times 10^{-3}/°C.$ The average resistivity changes over a hot melt pool of about 2" diameter is being sensed without direct contact, using impedance change eddy current techniques.

The induction thermometer of this invention utilizes circuits that sense the self-impedance (not transfer impedance) of the work coil, amplifying these small work coil impedance changes towards a precision goal of $$\frac{\Delta V}{V \Delta T} = \frac{1\%}{°C.}$$

Figure 5A:
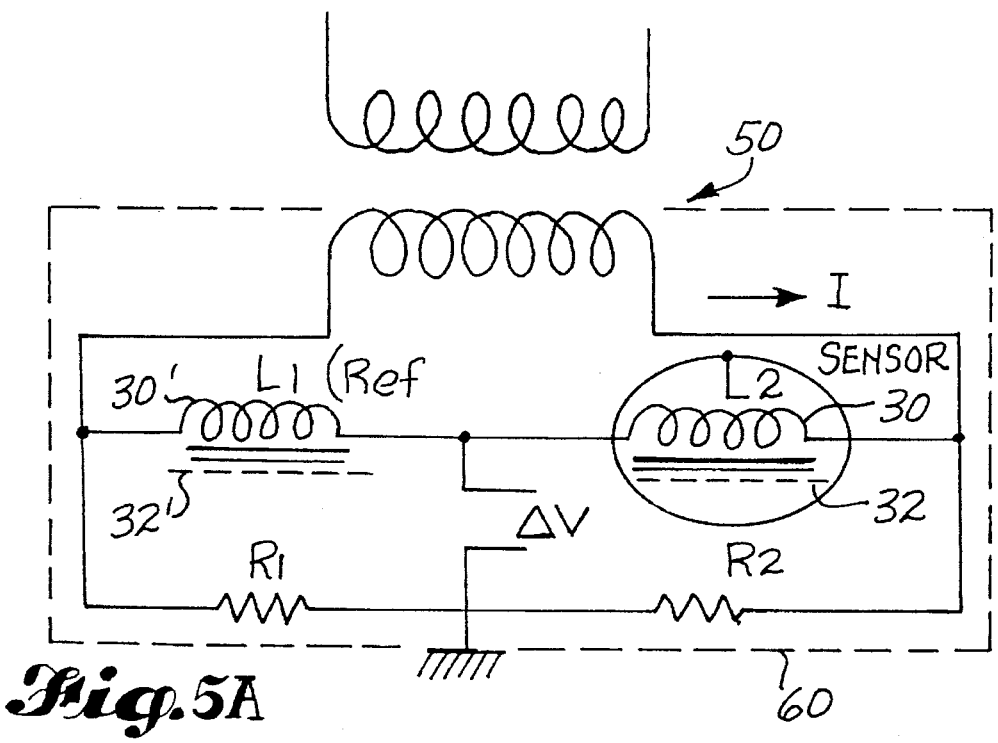
FIG. 5A is a schematic circuit diagram showing a power bridge for indicating when the temperature of the susceptor of FIGS. 1 and 2 is at the desired or reference point.

As shown in FIG. 5, the Q of the inductive circuit including the coil 30 and the susceptor 32 is a dimensionless power ratio of stored to dissipated power in the inductive circuit, expressed as $$Q = \frac{\omega L}{R}$$

$$Q_u = \frac{\omega L}{R_{wc}} \geq 30 \text{(typ)}$$

$$Q_L = \frac{\omega L}{R_{wc} + R_s} \sim 5 \text{(typical)}$$

where $Q_u$ is the Q of the unloaded work coil 30 and $Q_L$ is the Q of the loaded work coil 20. Thus, Q is a measure of how sharply tuned and therefore how "temperamental" a load is.

The changing resistance of the susceptor as its temperature changes during inductive heating is detected using a simple L-R bridge, shown in FIG. 5. The bridge includes a high-power transformer 50 of about 500 watts operating at about 35–55 KHz. The transformer 50 is connected across a pair of series-connected inductors $L_1$ and $L_2$, and a pair of series-connected resistors $R_1$ and $R_2$, both series-connected pairs connected to each other in parallel and in parallel with the transformer 50. A shunt 52 with a voltage sensor 54 such as a voltmeter or an oscilloscope is connected between the two resistors and the two inductors.

The inductor $L_1$ is a reference inductor coupled magnetically to a reference susceptor 32' heated by a temperature controlled heater 55, shown in FIG. 6C, to a known temperature. $L_2$ is the work coil 30 and the magnetically coupled bond line susceptor 32 whose inductance/resistance is being sensed. The two sides of the bridge are asymmetric by at least 2:1 to put most of the power in the bond line for the sake of efficiency, since power dissipated in the reference side of the bridge is wasted. The two coils $L_1$ and $L_2$ are design to track fairly closely so that their inductances and Q's vary consistently with frequency.

The bridge in FIG. 5 is used to set up a null condition at a selected temperature. In practice, trimmer potentiometers and variable trimmer capacitors are provided, as shown in FIG. 6A, to effect a null. As the bond line and susceptor temperature rises, the temperature dependent reactance and Q changes are manifested as a voltage, $\Delta V$, rising-out-of-a-null, as displayed in FIG. 7. For the purpose of this embodiment, it suffices to have a linear temperature response over a limited (100° F.) region centered on the polyimide bond line process temperature of about 620° F. To this end the "memory" of the "reference" coil and its cool, unchanging susceptor may be referenced to a hot reference temperature of say 250° F. to give linearity around 600° F., the process temperature. This constitutes a special purpose thermometer for detection of a desired process temperature of a particular polyimide material and is effected by putting a regulated and heated metal susceptor under the reference inductor $L_1$.

In the circumstance wherein tapered parts are being inductively welded, as will normally be the case with aircraft wings, the distance between the work coil 30 and the susceptor 32 will change in the course of movement of the work coil 30 along the bond line. The resulting uncertainty is removed by arranging for the reference coil $L_1$ to move a corresponding distance from the reference susceptor 32', which can be accomplished by positioning the reference coil 30' and its heated susceptor 32' against opposite faces of the wing skin or other top piece being welded, laterally off-set from the work coil 30.

The bridge of FIG. 7 is "balanced,"

$$\frac{\Delta V}{I} = 0, \quad [1]$$

when $$\frac{Z_2}{Z_1} = \frac{R_2}{R_1}$$

For high Q, or at least equal Q, coils [1] becomes $$\frac{X_2}{X_1} = \frac{\omega L_2}{\omega L_1} = \frac{R_2}{R_1} \quad [1B]$$

Note that two reactors are balanced with a simple resistive bridge.

Figure 5B:
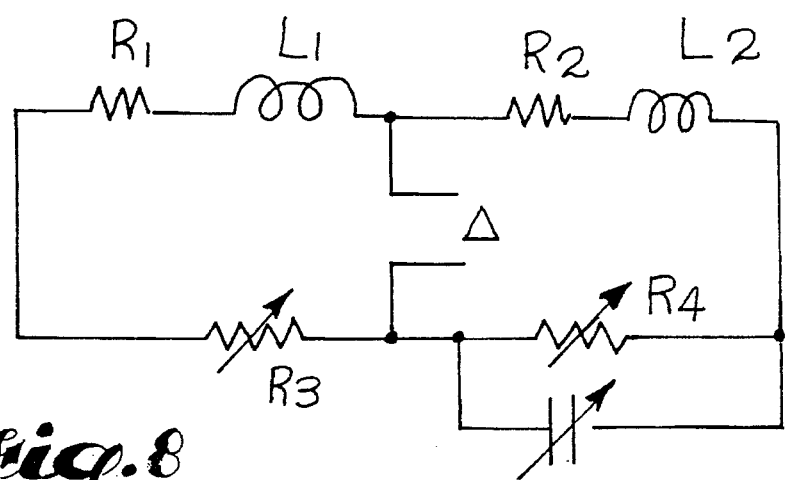
FIG. 5B is a schematic diagram of a power bridge having work and reference coils of unequal Q's.

Now considering the more realistic case of work and reference coils with unequal Q's, represented by the circuit diagram in FIG. 5B. This double balanced condition is:

$$\frac{L_1}{L_2} = \frac{R_3}{R_4} \quad \text{(Inductor balance)} \quad [2]$$

and $$C = \frac{D_2 - D_1}{\omega R_4} \quad \text{(Dissipation balance)} \quad [3]$$

Note that a pair of resistors balance a pair of (inductive) reactance's [2]. This orthogonality shows up in the dissipative balance condition, where a small shunt capacitor can be adjusted to balance the differential dissipation in the other two arms.

From FIG. 5B $$D_2 - D_1 = R_4 \omega C \quad [4]$$

If we define a fourth-arm "dissipation factor" $D_4$, it becomes $$D_4 = \frac{1}{\omega C R_4} \quad [D_4 = 1/Q_4] \quad [5]$$

then $$D_2 - D_1 = \frac{1}{\tan \delta_4}$$

or $$\Delta D = (\tan \delta_4)^{-1}$$

The reactance—resistance triangles and dissipation triangles bear an orthogonal relation.

Results: $X_L$-Null: Coarse 250Ωpot$_{(ctg)}$
$X_L$-Null: Fine 1 KΩpot$_{(ctg)}$
Range: Total R "range" ±12Ω in 170Ω
Q (or D) null
$C_2$ 15–240 pf (variable)
A stable −70 db null over at least a 10 KHz band.
$\Delta V$ bridge unbalance output voltage that is fairly linear. It is really a slope or sensitivity calibrator not an absolute (thermometric) calibrator.

Thus, a bridge unbalance slope of $$\frac{\Delta V}{\Delta T} \approx 5 \times 10^{-3} \, volt/°C.$$

is obtained for a drive of about 30 volts. The bridge drive for in-process heating will be more like 300 volts.

Figure 8:
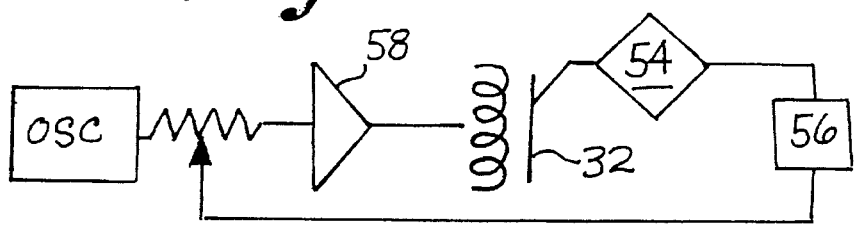
FIG. 8 is a circuit diagram of a control system for controlling the power to the work coil as a function of temperature as sensed by the circuits of FIGS. 5 and 6.

As shown in FIG. 8, the signal produced by the voltage sensor 54 is used to interactively control the process by adjusting the power to the work coil 30 in a closed loop RF heating control circuit, or by adjusting the speed of travel of the work coil 30 over the bond line so as to maintain the melt pool temperature within the desired range of optimum processing temperature, that is, 620°±25° F. in the case of the DuPont Avamid KIIIB polyimide. The "temperature sensor" signal shown in FIG. 8 is actually the signal from the voltage sensor 54, and is conditioned in a suitable conditioning circuit 56, which would depend on the voltage sensor used and could produce a digital on/off signal to the power amplifier 58 to turn the amplifier up and down, in the nature of a thermostat control, whenever the melt pool temperature drops below or exceeds the optimal temperature range. Preferably, the signal conditioner circuit 56 produces a signal proportional to the voltage sensor signal to adjust the power to the work coil up or down from a predetermined average power level known to maintain a steady state temperature in the melt pool at the coil speed used.

Thus, a system is shown that remotely senses temperature in an embedded bond line with the following characteristics:

1. Heater/Sensor: The work coil, inducing circulating eddy currents in a thin metal susceptor in a polyimide bond line, can not only readily heat the bond line to a desired temperature, e.g. 620° F., but can also be used to sense susceptor temperature by means of the change in susceptor eddy resistance, and consequent work coil impedance changes.

2. Hi-Power Bridge, The small (<10%) changes in impedance (see above) can be amplified by a Hi-Power bridge. Even with large "magnification". a stable −70 db bridge null can be maintained at 20+ watt rf level, with cooling water flowing.

3. Stability: The work coil is internally cooled with flowing water so it stays close to room temperature. The bridge is enclosed in a shielded box 60 to protect it from disruptive stray inductances. The bridge null is sensed with an oscilloscope or a voltmeter, is filtered with a low bandpass filter, shown in FIG. 6B, to reject harmonics.

4. Sensitivity, Nulling at 150° C., the bridge sensitivity between 250° C.–420° C. is $$\frac{\Delta V}{V \Delta T} = +.54 \frac{\%}{°C} \quad \text{(mean value)}$$

$$\frac{\Delta V}{V \Delta T} = +5.4 \times 10^{-3}/°C.$$

increasing somewhat below 320° C.

This value compares favorably with the TCR of copper at 250° C.

$$TCR_{cu} = \frac{\Delta R}{R \Delta T} = 2.5 \times 10^{-3}/°C.$$

"Looking" through the "prisms" of the work-coil (an N:1 transformer) in tandem with the bridge, the TCR sensitivity of the copper itself is about doubled.

Obviously, numerous modifications and variations of the disclosed preferred embodiment will occur to those skilled in the art in view of this disclosure. Accordingly, it is expressly to be understood that these modifications and variations, and the equivalents thereof, may be practiced while remaining within the spirit and scope of the invention as defined in the following claims, wherein

I claim:

1. A dual function heating and temperature sensing circuit for control of an induction work coil in an inductive thermoplastic welding process comprising:

a work coil having a coil inductance inductively coupled with a conductive susceptor embedded in an interface between two thermoplastic parts to be welded together;

an asymmetric bridge circuit having a reference inductance connected in series with the coil inductance, the coil and reference inductances being, in turn, connected in parallel with two series resistances to form a bridge; the asymmetry of the bridge circuit putting most of the power in the coil inductance;

temperature control means for maintaining the reference inductance substantially at a selected temperature; and a voltage sensing shunt connected on one end between said inductances and connected on the other end between said resistances, said voltage sensing shunt indicating low voltage when the value of the pair of inductances is proportional to the value of said pair of resistances.

2. The dual function heating and temperature sensing circuit of claim 1, wherein:

the reference inductance includes a reference coil magnetically coupled to a reference susceptor.

3. The dual function heating and temperature sensing circuit of claim 2, wherein the temperature control means includes:

a temperature controlled heater thermally coupled to said reference susceptor for maintaining said reference susceptor at a temperature at which the temperature dependent coil inductance changes in a parallel linear manner with susceptor to which the work coil is coupled.

4. A reflex thermometry process for sensing the temperature of a copper foil susceptor embedded in an interface between two thermoplastic parts to be welded together by tracking work coil impedance changes in the same work coil that does the heating, comprising:

inductively coupling a work coil with said copper foil susceptor;

inductively coupling a reference coil with a conductive reference susceptor;

measuring a voltage in a bridge circuit between to series-connected inductances and two series-connected resistances, one of said inductances, $L_2$, being a sensed inductance of said work coil and said inductively coupled copper-foil susceptor, and the other inductance being a reference inductance, $L_1$, series connected to said sensed inductance, both connected in parallel with said two series-connected resistances.

5. A reflex thermometry process as defined in claim 4, wherein:

said measuring step includes sensing glow voltage with a voltage sensing shunt connected, on one end between said inductances and connected on the other end between said resistances, said voltage sensing shunt indicating low voltage when the value of said pair of inductances is proportional to the value of said pair of resistances.

6. A reflex thermometry process as defined in claim 4, further comprising the step of:

controlling the temperature of said reference susceptor with a temperature controlled heater thermally coupled to said reference susceptor for maintaining said reference susceptor at a temperature at which the temperature dependent inductance changes in a parallel linear manner with said sensed susceptor.

7. In a process for inductively welding thermoplastic pads together using a work coil moving over a bond line between said pads while projecting an alternating magnetic field into said pads and around a foraminous susceptor in said bond line to induce eddy currents in said susceptor that heat said susceptor to soften said thermoplastic material in the faying surfaces at said bond line, the improvement comprising:

regulating said bond line weld temperature using a temperature control system having a dual-function induction-heater/induction thermometer built around a high-power bridge-fed work coil.

8. A process for inductively welding thermoplastic pads together as defined in claim 7, further comprising:

sensing resistivity changes in said susceptor as a function of temperature changes by tracking impedance changes in said work coil.

9. A process for inductively welding thermoplastic pads together as defined in claim 8, further comprising:

means for bridge output sensor signal matching/harmonic suppression to preserve signal purity in the presence of harmonics from at least one of said induction heater and component (ferrite core) non-linearities.

10. A process for inductively welding thermoplastic parts together as defined in claim 8, wherein:

said susceptor is a copper foil ribbon.

11. The sensing circuit of claim 1 further comprising a cooling water circuit associated with the work coil for maintaining the work coil at a temperature close to room temperature.

12. The sensing circuit of claim 1 further comprising a low bandpass filter coupled to the voltage sensing shunt for rejecting harmonics, thereby improving stability of the circuit.

13. The sensing circuit of claim 1 further comprising a transformer connected in parallel with the bridge inductances and resistances.

14. The sensing circuit of claim 13 wherein the transformer provides about 500 watts of power at about 35–55 KHz.

15. The sensing circuit of claim 1 wherein each resistance includes a variable resistor to allow trimming of the bridge to a null condition at a selected temperature.

16. The sensing circuit of claim 1 further comprising a closed loop RF heating control circuit coupled with the voltage detected by the voltage sensing shunt for controlling a power amplifier connected with the work coil to control power supplied to the work coil to maintain the susceptor in the interface within +25° F. of a selected temperature.

* * * * *